United States Patent [19]
Nakajima

[11] Patent Number: 5,220,645
[45] Date of Patent: Jun. 15, 1993

[54] OUTPUT APPARATUS

[75] Inventor: Nobuyuki Nakajima, Kawasaki, Japan

[73] Assignee: Canon Kabushiki Kaisha, Tokyo, Japan

[21] Appl. No.: 829,559

[22] Filed: Feb. 5, 1992

Related U.S. Application Data

[63] Continuation of Ser. No. 746,155, Aug. 14, 1991, abandoned, which is a continuation of Ser. No. 670,467, Mar. 13, 1991, abandoned, which is a continuation of Ser. No. 489,015, Mar. 6, 1990, abandoned.

[30] Foreign Application Priority Data

Mar. 7, 1989 [JP] Japan ................................. 1-52911

[51] Int. Cl.⁵ .......................................... G06K 15/00
[52] U.S. Cl. .................................... 395/113; 395/115
[58] Field of Search ............... 395/113, 111, 115–116, 395/164; 358/444, 404; 355/200, 203, 204, 205, 206; 340/798–799; 400/70; 346/154

[56] References Cited

U.S. PATENT DOCUMENTS 4,415,981 11/1983 Cutter et al. ......................... 364/518
4,571,069 2/1986 Kimura et al. ...................... 395/296

FOREIGN PATENT DOCUMENTS

0042071 12/1981 European Pat. Off. ............. 364/519
62-120775 6/1987 Japan .................................. 364/519
62-264757 11/1987 Japan .................................. 364/519

Primary Examiner—Arthur G. Evans
Attorney, Agent, or Firm—Fitzpatrick, Cella, Harper & Scinto

[57] ABSTRACT

An output apparatus comprises: a cache memory to temporarily store the bit map pattern data which was developed to the bit map pattern on the basis of character information; an accumulating device to accumulate a plurality of bit map pattern data extracted from the cache memory; a rewriting unit to rewrite the bit map pattern data stored in the cache memory; a print controller to print on the basis of the data accumulated in the accumulating device; a detector to detect an operating state in the print controller; and a control unit to control the data rewriting process in the cache memory and the data clearing process in the accumulating device in accordance with the operating state detected by the detector. Since the rewriting and clearing processes to the cache memory are executed synchronously with the printing operation, even if a paper jam occurred, there is no need to develop to the cache memory.

46 Claims, 4 Drawing Sheets

OUTPUT APPARATUS

This application is a continuation of application Ser. No. 07/746,155 filed Aug. 14, 1991, now abandoned, which is a continuation of application Ser. No. 07/670,467 filed Mar. 13, 1991, now abandoned, which is a continuation of application Ser. No. 07/489,015 filed Mar. 6, 1990, now abandoned.

BACKGROUND OF THE INVENTION

1. Field of the Invention

The present invention relates to an output apparatus and, more particularly, to an output apparatus using a cache memory to realize a character output.

2. Related Background Art

Hitherto, in many printing apparatuses, for instance, when a vector character is output, the vector character is developed in a bit map on the basis of the character information of the vector character and is temporarily written into a cache memory. Since there is a limitation in the capacity of the cache memory, when the memory area lacks or after the elapse of a predetermined time or the like, the cache memory is initialized for the next use.

However, in the conventional apparatus, since the rewriting and clearing processes of the cache memory are executed asynchronously with the printing operation of the printing apparatus, for instance, in the case where a paper jam occurs in the printing apparatus and the page must be again formed, it is necessary to again execute the processes from the development of a bit map into the cache memory.

SUMMARY OF THE INVENTION

The present invention is made to solve the above problems and it is an object of the invention to provide an output apparatus in which by executing the writing and clearing operations for a cache memory synchronously with the printing operation, even if a paper jam or the like occurred, there is no need to execute the development into the cache memory.

In consideration of the above points, it is another object of the invention to provide an output apparatus comprising: storage means for temporarily storing data which was developed to a bit map pattern on the basis of character information; accumulating means for accumulating a plurality of data extracted from the storage means; rewriting means for rewriting the data in the storage means; print control means for printing on the basis of the data accumulated in the accumulating means; detecting means for detecting an operating state in the print control means; and control means for controlling a data rewriting process in the storage means and a data clearing process in the accumulating means in accordance with the operating state which is detected by the detecting means, wherein the rewriting and clearing processes are controlled in accordance with the operating state.

Still another object of the invention is to provide an output apparatus comprising: storage means for temporarily storing bit map pattern data which was developed in a bit map pattern on the basis of character information; accumulating means for accumulating a plurality of bit map pattern data extracted from the storage means; rewriting means for rewriting the bit map pattern data stored in the storage means; print control means for printing on the basis of the data accumulated in the accumulating means; detecting means for detecting an operating state in the print control means; and control means for controlling a data rewriting process in the storage means and a data clearing process in the accumulating means in accordance with the operating state detected by the detecting means.

Further another object of the invention is to provide an output apparatus comprising: storage means for storing coordinate point data indicative of a pattern and dot pattern data indicative of the pattern; converting means for converting the coordinate point data stored in the storage means into dot pattern data; holding means for temporarily holding the dot pattern data converted by the converting means; and storage means for storing the dot pattern data stored in the memory means and the dot pattern data converted by the converting means in correspondence to the pattern data to construct one page which is input, wherein when the same pattern is restored into the storage means, the dot pattern data which is held in the holding means can be used in accordance with the state of the apparatus.

DETAILED DESCRIPTION OF THE PREFERRED EMBODIMENTS

A preferred embodiment according to the present invention will be described in detail hereinbelow with reference to the drawings.

Figure 1:
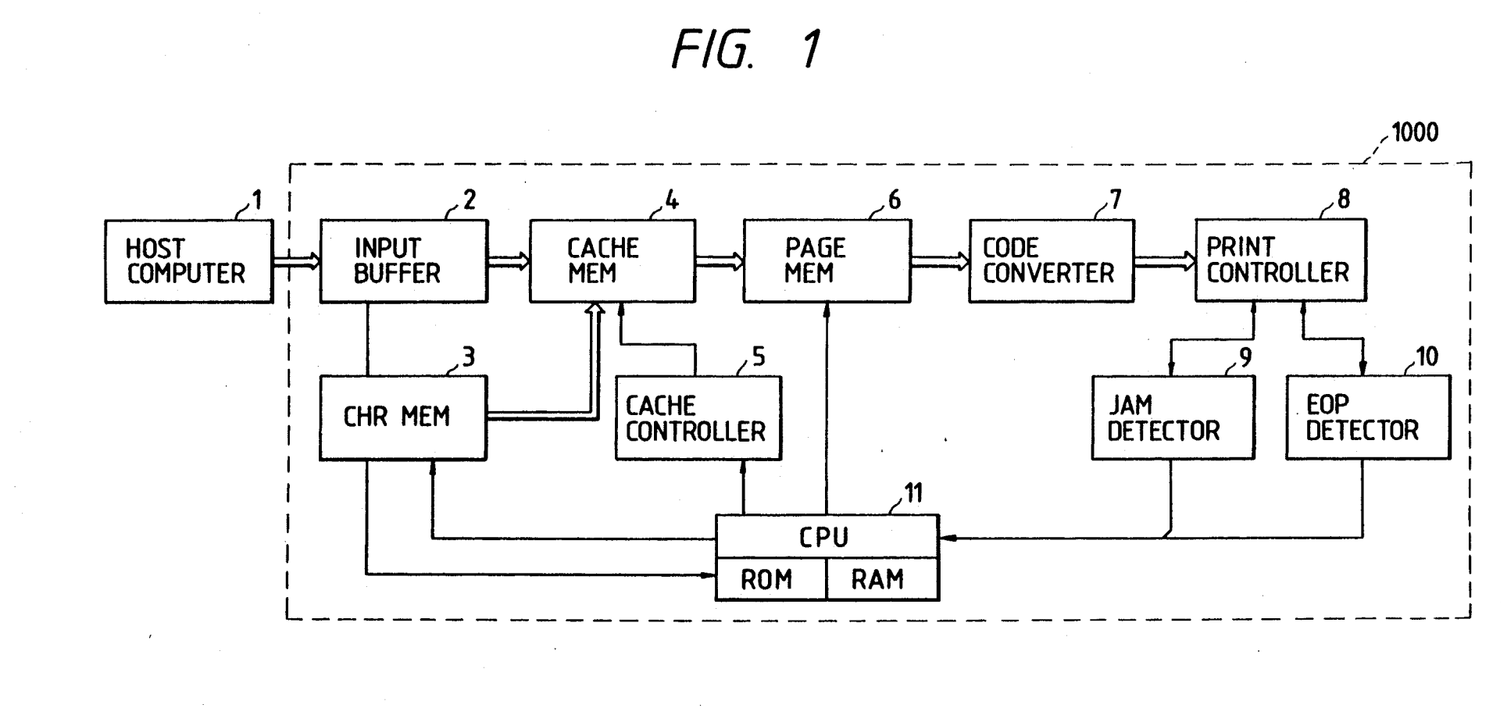
FIG. 1 is a constructional diagram showing an example of a printing apparatus according to an embodiment of the present invention.

Description of the Construction (FIG. 1)

FIG. 1 is a constructional diagram showing an example of a printing apparatus according to the invention. In the diagram, reference numeral 1 denotes a host computer to transmit various data and 1000 indicates a printer.

Constructional Diagram of the Printer 1000

Figure 3:
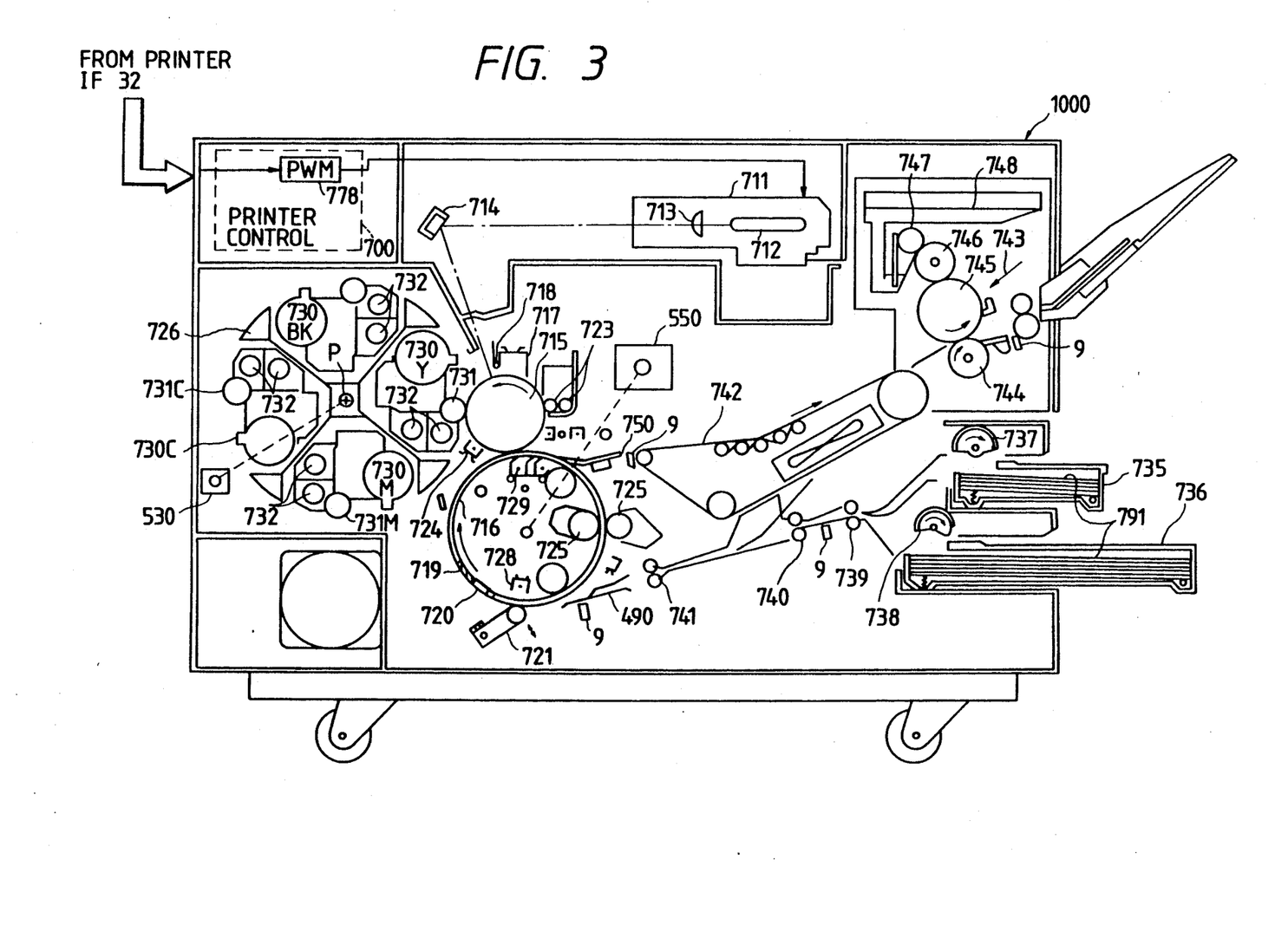
FIG. 3 is a diagram showing a structure of a printer.
Figure 4:
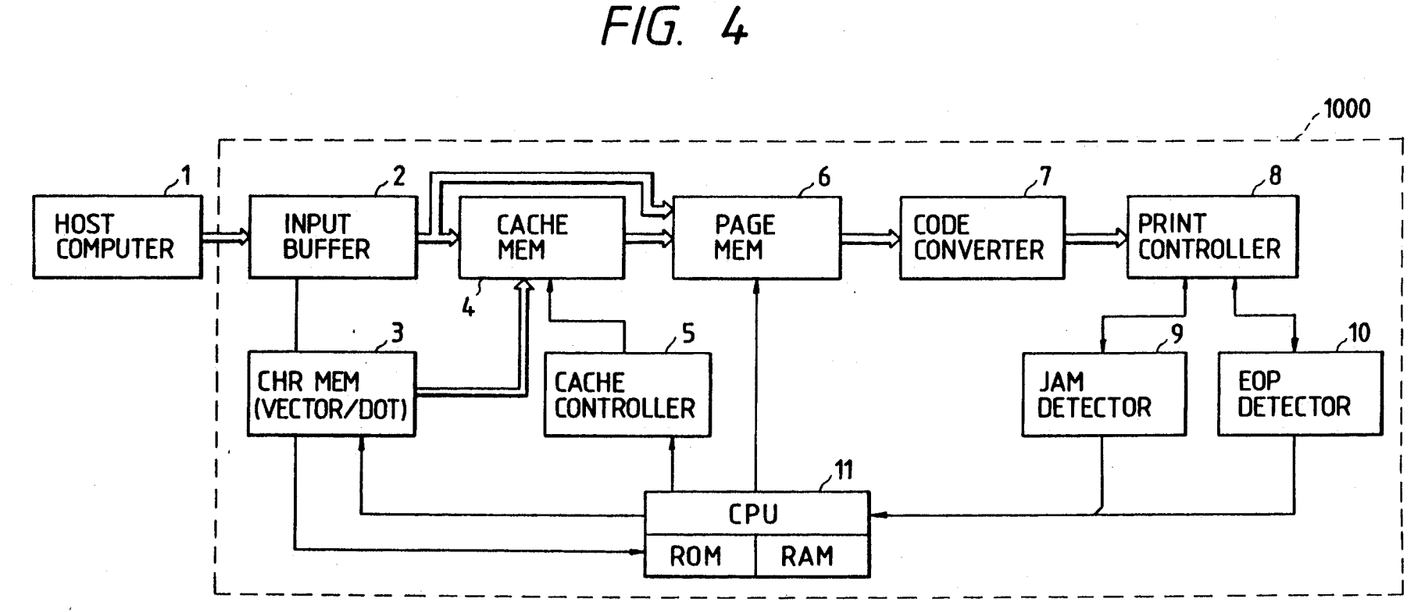
FIG. 4 is a constructional diagram showing an example of a printing apparatus according to another embodiment.

An outline of the printer 1000 shown in FIG. 1 will now be described with reference to FIG. 3. Reference numeral 778 denotes a pulse width modulator (PWM). The PWM 778 receives data from the host computer 1 shown in FIG. 1 through a printer interface (I/F) 32 and converts, for instance, a binary or multivalue digital image signal into an analog image signal and compares the analog image signal with a triangular wave of a predetermined period, thereby forming a pulse width modulation (PWM) signal. The PWM signal is supplied to a laser output section 711 at the post stage and utilized there to form a gradation image by on/off modulating a laser beam. Although a flow of data is omitted, it is practically shown in FIG. 1. Reference numeral 711 denotes a scanner comprising: a laser output section to convert the image signal from the PWM 778 into a photo signal; a polygonal mirror 712 of a polyhedron (for example, octahedron), a motor (not shown) to rotate the mirror 712; an f/θ lens (image forming lens) 713; and the like. Reference numeral 714 indicates a reflecting mirror to change a light path of a laser beam and 715 indicates a photo sensitive drum. The laser beam emitted from the laser output section is reflected by the polygonal mirror 712 and passes through the lens 713 and mirror 714 and linearly scans (raster scan) on the surface of the drum 715, thereby forming a latent image corresponding to an input image.

Reference numeral 717 indicates a primary charging device; 718 a whole surface exposing lamp; 723 a cleaner section to collect the residual toner which was not copy transferred; and 724 a pre-copy transfer charging device. Those components are arranged around the drum 715.

Reference numeral 726 denotes a developing unit to develop the electrostatic latent image formed on the surface of the photosensitive drum 715 by the laser exposure. Reference numerals 731Y, 731M, 731C, and 731Bk indicate developing sleeves which come into contact with the drum 715 and directly develop the latent image; 730Y, 730M, 730C, and 730Bk represent toner hoppers to keep spare toners; and 732 denotes screws to transport a developing agent. The developing unit 726 is constructed by the sleeves 71Y to 731Bk, toner hoppers 730Y to 730Bk, and screws 732. Those components are arranged around a rotary shaft P of the developing unit. For instance, in the case of forming a yellow toner image, the yellow toner development is executed at the position shown in the diagram. When a magenta toner image is formed, the developing unit 726 is rotated around the shaft P as a rotational center in the diagram and the developing sleeve 731M in the magenta developing device is set at the position which comes into contact with the photo sensitive drum 715. The developments of the cyan and black toner image are also executed in a manner similar to the above. Although the above embodiment has been described with respect to a color printer, the invention can, be also applied to a printer constructed with only the unit of black Bk or a printer to form a black and white pattern by using only the Bk unit.

Reference numeral 716 denotes a copy transfer drum to copy transfer the toner image formed on the photo sensitive drum 715 onto a paper; 719 indicates an actuator plate to detect a moving position of the copy transfer drum 716; 720 a home position sensor to detect that the copy transfer drum 716 has moved the home position when the actuator plate 719 approaches; 725 copy transfer drum cleaners; 727 a paper pressing roller; 728 a discharging device; and 729 a copy transfer charging device. The above components 719, 720, 725, 727, 728, and 729 are arranged around the copy transfer drum 716.

On the other hand, reference numerals 735 and 736 denote paper feed cassettes to enclose papers (cut sheets); 737 and 738 indicate paper feed rollers to feed the papers from the cassettes 735 and 736; and 739, 740, and 741 represent timing rollers for matching the timing to feed and convey the papers. The paper which was fed and conveyed through those components is led to a paper guide 749 and the front edge is grasped by a gripper, which will be explained hereinlater, and is wrapped around the copy transfer drum 716. Then, the processing routine advances to the image forming process.

Reference numeral 550 denotes a drum rotating motor for synchronously rotating the photo sensitive drum 715 and copy transfer drum 716. Reference numeral 750 indicates a peeling-off claw to peel off the paper from the copy transfer drum 716 after completion of the image forming process; 742 a conveying belt to convey the paper which was peeled off; and 743 an image fixing section to fix the paper which was conveyed by the conveying belt 742. The image fixing section 743 has a pair of thermal pressure rollers 744 and 745. Reference numeral 9 indicates a paper jam detector, which will be explained later. The jam detector 9 can be arranged at any position on the conveying path.

Returning to FIG. 1, reference numeral 2 indicates an input buffer to temporarily store the data from the host computer 1; 3 denotes a character information memory to store character information (for instance, vector coordinates, character pitch, attribute, etc.); 4 a cache memory to store the data which was developed to a bit map on the basis of the character information in the memory section 3; 5 a cache controller to write and clear the data in the cache memory 4; 6 a page memory for receiving the bit map data from the cache memory 4 and storing the data of one page; 7 a code converter for converting the bit map data from the page memory 6 into the video signal and outputting; 8 a print controller to control the printing operation on the basis of the video signal; 9 the jam detector to detect a paper jam which occurred in the print controller 8; 10 an end-of-print detector to detect the end of print in the print controller 8; and 11 a CPU to control the whole apparatus. The CPU 11 includes an ROM to store a processing procedure of the CPU, which will be explained hereinlater, and a RAM which is used as a work area.

Outline of the Operation

An outline of the operation of the printing apparatus in the embodiment with the above construction will now be described hereinbelow.

When print data or the like is input from the host computer 1, the data is accumulated into the input buffer 2. The vector coordinates, character pitch and attribute are extracted from the character information memory 3 and a bit map is developed on the basis of the accumulated data. Until a signal indicative of the end of print of the previous page by the print controller 8 is detected by the end-of-print detector 10, the cache controller 5 inhibits the writing operation into the cache memory 4, thereby preventing the bit map data from being broken. After that, when the end-of-print detector 10 detects the end of print of the image data of the page, a state of the cache memory 4 is discriminated and the writing operation is executed. If area in the cache memory 4 lacks, the writing operation into the cache memory 4 is executed after it was cleared. If area in the cache memory still exists, the writing operation into the cache memory 4 is immediately performed. When an amount of data which was transferred from the cache memory 4 to the page memory 6 reaches the amount of one page, the print controller 8 is made operative so as to start the printing operation. On the other hand, the activated print controller 8 receives the bit map data which was converted into the video signal by the code converter 7 and starts the printing process. After that, upon completion of the printing process of one page, the page memory 6 is cleared to print the next page. If page data to be printed exists, the writing to the cache memory 4 is restarted.

Figure 2:
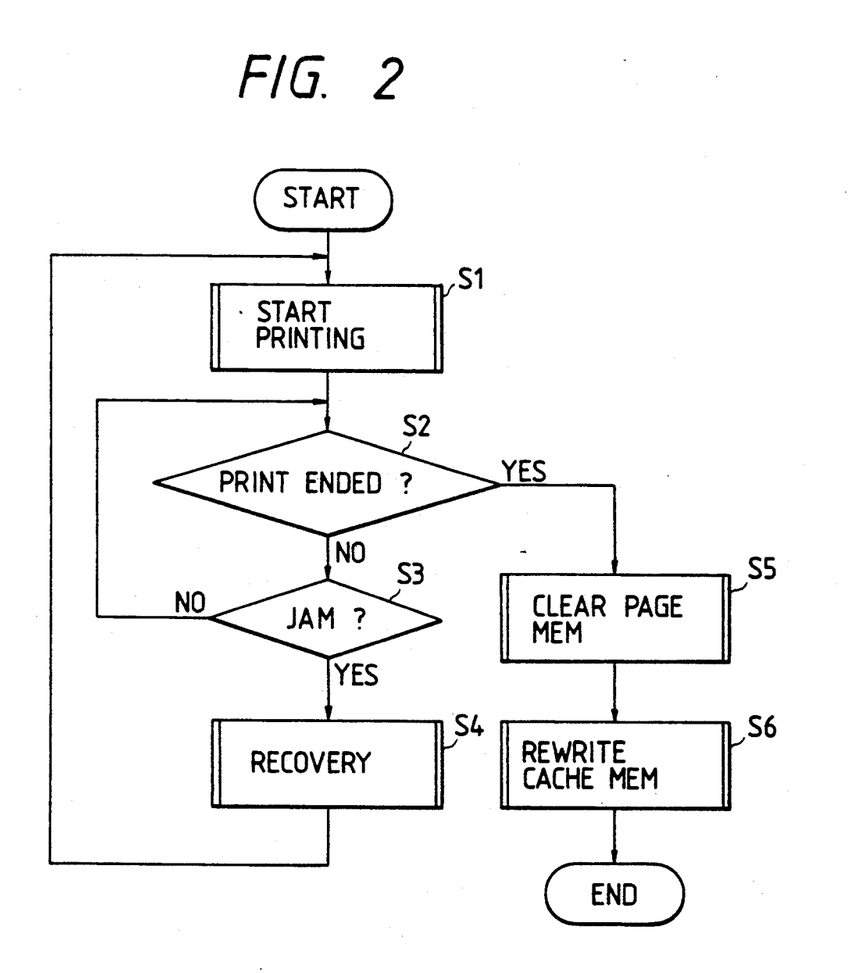
FIG. 2 is a flowchart showing a processing procedure in the embodiment.

Description of the Processing Procedure (FIG. 2)

The processing procedure in the embodiment will now be described hereinbelow in accordance with the flowchart shown in FIG. 2.

As mentioned above, the data from the host computer 1 is accumulated into the input buffer 2 and serially processed. The character information is extracted from the character information memory 3 and developed to a bit map on the basis of the input data. Until the signal indicative of the end of printing operation of the data of the previous page by the print controller 8 is detected by the end-of-print detector 10, the cache controller 5 does not execute the writing operation to the cache memory 4. After that, when the end of printing operation of the page is detected by the end-of-print detector 10 and is informed to the cache controller 5 through the CPU 11, the state of the cache memory 4 is discriminated. If area in the cache memory 4 lacks, the writing operation to the cache memory 4 is executed after the memory 4 was cleared. If area in the cache memory 4 still exists, the writing operation to the cache memory is immediately executed. When an amount of data which was transferred from the cache memory 4 to the page memory 6 reaches the amount of one page, in step S1, the print controller 8 is activated so as to start the printing operation. That is, the bit map data of one page is converted into the video signal by the code converter 7 and transferred to the print controller 8. Next, when the print controller 8 starts the printing operation, the rewriting of the cache memory 4 becomes impossible. In step S2, a check is made to see if the end-of-print signal has been input from the end-of-print detector 10 or not. In the next step S3, a check is made to see if a jam signal from the jam detector 9 has been input or not. If the paper jam has occurred, the processing routine advances to step S4. For instance, after an error was indicated or the data in the page memory 6 was regenerated (the character data of the page remains in the cache memory 4), the processing routine is returned to step S1 and the printing operation is restarted.

On the other hand, when the end of print signal is input from the end-of-print detector 10 in step S2, the processing routine advances to step S5 and the content of the page in the page memory 6 is cleared. In step S6, the data in the cache memory 4 can be rewritten. By the rewriting process, if necessary, the development into the cache memory 4 for the next page is started and the forming process of the data in the page memory 6 is started.

According to the embodiment, the rewriting of the data in the font cache memory is executed after the data of the page was transferred to the print controller. Therefore, the operation to again develop the bit map into the cache memory when a trouble such as a paper jam or the like in the print controller occurred can be omitted.

In the embodiment, the content in the cache memory 4 for the next page cannot be rewritten until the completion of the printing process in the print controller 8. However, there is also considered a method whereby a plurality of cache memories 5 are prepared, bit map data are sequentially preliminarily developed, and when the printing process is finished in the print controller 8, the content of the corresponding cache memory 4 is updated.

As described above, according to the invention, by executing the writing and clearing operations to the cache memory synchronously with the printing operation, for instance, even if a paper jam or the like occurred, there is no need to execute the development to the cache memory and the process can be simplified.

Vector Character and Dot Character Mixedly Exist

The above embodiment has been described with respect to the case where the character in which the data of the input buffer 2 is expressed by the vector data stored in the character information memory 3 is developed to the dots and stored into the cache memory 4. However, there is also considered a case where vector characters and dot characters are stored in the character information memory 3 and a necessary pattern is properly obtained on the basis of the style, size, and deformation information. Therefore, there is considered a case where a pattern from the vector character and a pattern from the dot character mixedly exist in one page. When a jam occurs, to reconstruct the page, the pattern stored in the cache memory 4 is again used in a manner similar to the above. As a prerequisite, the time which is required to develop the dot character into the page memory is shorter than the time which is required in the case of converting the vector character into the dots and developing into the page memory.

Although the invention has been described in detail above, a laser beam printer, an ink jet printer (bubble jet printer: U.S. Pat. No. 4,520,373) having a full line head, or the like can be used as a printer 1000 in the invention.

What is claimed is:

1. An output apparatus comprising:
   storage means for temporarily storing bit map pattern data which was converted into a bit map pattern on the basis of coordinate point data representing the bit map pattern;
   writing means for writing bit map pattern data which was converted into the bit map pattern into said storage means;
   print means for printing the bit map pattern data which was converted into the bit map pattern; and
   control means for enabling said writing means to write the bit map pattern data into said storage means when printing of data by said print means is ended.

2. An output apparatus comprising:
   memory means for storing coordinate point data indicative of a pattern and dot pattern data indicative of a pattern;
   conversion means for converting the coordinate point data stored in said memory means into dot pattern data;
   temporary storage means for temporarily storing the dot pattern data converted by said conversion means; and
   storage means for storing the dot pattern data stored in said memory means and the dot pattern data converted by said conversion means in correspondence to the pattern to construct a predetermined area which is input,
   wherein the dot pattern data stored in said temporary storage means is transferred to said storage means in order to reconstruct the dot pattern in the predetermined area in said storage means in the event that the dot pattern was not properly output due to jamming in said apparatus.

3. An output apparatus according to claim 1, wherein said storage means temporarily stores the bit map pattern data which was developed into a bit map pattern on the basis of vector data.

4. An output apparatus according to claim 1, wherein said storage means temporarily stores the bit map pattern data which was developed into a bit map pattern on the basis of scalable data.

5. An output apparatus according to claim 1, wherein said storage means comprises a cache memory.

6. An output apparatus according to claim 1, wherein said print means comprises a laser beam printer.

7. An output apparatus according to claim 1, wherein said print means comprises a color printer.

8. An output apparatus according to claim 1, wherein said print means prints with ink.

9. An output apparatus according to claim 2, wherein said storage means stores on page of data to be output.

10. An output apparatus according to claim 2, wherein said temporary storage means comprises a cache memory.

11. An output apparatus according to claim 2, wherein the dot pattern is output with a laser beam printer.

12. An output apparatus according to claim 2, wherein the dot pattern is output with a color printer.

13. An output apparatus according to claim 2, wherein the dot pattern is output with ink.

14. An output apparatus comprising:
memory means for storing coordinate point data indicative of a pattern;
conversion means for converting the coordinate point data stored in said memory means into dot pattern data;
temporary storage means for temporarily storing the dot pattern data converted by said conversion means; and
storage means for storing the dot pattern data converted by said conversion means in correspondence to the pattern to construct a predetermined area which is input,
wherein the dot pattern data stored in said temporary storage means is transferred to said storage means in order to reconstruct the dot pattern in the predetermined area in said storage means in the event that the dot pattern was not properly output due to jamming in said apparatus.

15. An output apparatus according to claim 14, wherein said storage means stores on page of data to be output.

16. An output apparatus according to claim 14, wherein said temporary storage means comprises a cache memory.

17. An output apparatus according to claim 14, wherein the dot pattern is output with a laser beam printer.

18. An output apparatus according to claim 14, wherein the dot pattern is output with a color printer.

19. An output apparatus according to claim 14, wherein the dot pattern is output with ink.

20. A method of outputting data comprising the steps of:
temporarily storing in storage means, bit map pattern data which was converted into a bit map pattern on the basis of coordinate point data representing the bit map pattern;
writing bit map pattern data which was converted into the bit map pattern into the storage means;
printing the bit map pattern data which was converted into the bit map pattern; and
enabling the writing of the bit map pattern data into the storage means when printing of data is ended.

21. A method according to claim 20, wherein the storage means temporarily stores the bit map pattern data on the basis of vector data.

22. A method according to claim 20, wherein said storage means temporarily stores the bit map pattern data on the basis of scalable data.

23. A method according to claim 20, where in the storage means comprises a cache memory.

24. A method according to claim 20, wherein data is printed with a laser beam printer.

25. A method according to claim 20, wherein data is printed with a color printer.

26. A method according to claim 20, wherein the data is printed with ink.

27. A method of outputting data from an apparatus having memory means for storing coordinate point data indicative of a pattern and dot pattern data indicative of a pattern, said method comprising the steps of:
converting the coordinate point data stored in the memory means into dot pattern data;
temporarily storing the converted dot pattern data; and
storing in storage means, the dot pattern stored in the memory means and the converted dot pattern in correspondence to the pattern to construct a predetermined area which is input,
wherein the dot pattern data being temporarily stored is transferred to the storage means in order to reconstruct the dot pattern in the predetermined are in the storage means in the event that the dot pattern was not properly output due to jamming in the apparatus.

28. A method according to claim 27, wherein the storage means stores on page of data to be output.

29. A method according to claim 27, wherein the converted dot pattern data is temporarily held in a cache memory.

30. A method according to claim 27, wherein the dot pattern is output with a laser beam printer.

31. A method according to claim 27, wherein the dot pattern is output with a color printer.

32. A method according to claim 27, wherein the dot pattern is output with ink.

33. A method of outputting data from an apparatus comprising the steps of:
converting coordinate point data indicative of a pattern into dot pattern data;
temporarily storing the converted dot pattern data; and
storing in storage means, the converted dot pattern data in correspondence to the pattern to construct a predetermined area which is input,
wherein the dot pattern data being temporarily stored is transferred to the storage means in order to reconstruct the dot pattern in the predetermined area in the storage means in the event that the dot pattern was not properly output due to jamming in the apparatus.

34. A method according to claim 33, wherein the storage means stores on page of data to be output.

35. A method according to claim 33, wherein the converted dot pattern data is temporarily stored in a cache memory.

36. A method according to claim 33, wherein the dot pattern is output with a laser beam printer.

37. A method according to claim 33, wherein the dot pattern is output with a color printer.

38. A method according to claim 33, wherein the dot pattern is output with ink.

39. An output apparatus according to claims 1, 2 or 14, further comprising means for receiving data from an external host computer.

40. An output apparatus according to claims 1, 2 or 14, further comprising means for detecting whether or not there is jamming in said apparatus.

41. An output apparatus according to claim 1, wherein said print means forms a pulse width modulation signal by converting a binary or multivalue digital image signal into an analog image signal and then comparing the analog image signal with a predetermined triangular wave.

42. An output apparatus according to claim 1, wherein said apparatus includes a plurality of said storage means.

43. An output apparatus according to claims 2 or 13, wherein said apparatus includes a plurality of said temporary storage means.

44. A method according to claims 20, 27 or 33, wherein data to be output is provided from an exterior apparatus.

45. A method according to claims 27 or 33, wherein the jamming is detected in response to information from a sensor.

46. A method according to claim 20, wherein a pulse width modulation signal is formed by converting a binary or multivalue digital image signal into an analog image signal and then comparing the analog image signal with a predetermined triangular wave in said printing step.

* * * * *

UNITED STATES PATENT AND TRADEMARK OFFICE
CERTIFICATE OF CORRECTION

PATENT NO. : 5,220,645

DATED : June 15, 1993

INVENTOR(S) : NOBUYUKI NAKAJIMA

Page 1 of 2

It is certified that error appears in the above-identified patent and that said Letters Patent is hereby corrected as shown below:

ON THE TITLE PAGE:

IN [57] ABSTRACT

Line 16, "occurred," should read --occurs,--.
    Line 17, "develop to" should read --develop--.

COLUMN 3

Line 22, "sleeves 71Y" should read --sleeves 731Y--.
    Line 36, "can," should read --can--.

COLUMN 6

Line 65, "developed" should read --converted--.

COLUMN 7

Line 1, "developed" should read --converted--.
    Line 12, "on" should read --one--.
    Line 44, "on" should read --one--.

COLUMN 8

Line 7, "where in" should read --wherein--.
    Line 13, "the" should be deleted.
    Line 29, "are" should read --area--.
    Line 34, "on" should read --one--.
    Line 60, "on" should read --one--.

UNITED STATES PATENT AND TRADEMARK OFFICE
CERTIFICATE OF CORRECTION

PATENT NO. : 5,220,645

DATED : June 15, 1993

INVENTOR(S) : NOBUYUKI NAKAJIMA

It is certified that error appears in the above-identified patent and that said Letters Patent is hereby corrected as shown below:

COLUMN 10

Line 4, "13," should read --14,--.

Signed and Sealed this

Nineteenth Day of April, 1994

BRUCE LEHMAN

Attest:

*Attesting Officer*        *Commissioner of Patents and Trademarks*